UNITED STATES PATENT OFFICE.

WILHELM GRAFF, OF LESUM, NEAR BREMEN, PRUSSIA, GERMANY.

PROCESS OF RECOVERING THE FATTY CONSTITUENTS FROM WASH-WATERS.

SPECIFICATION forming part of Letters Patent No. 389,295, dated September 11, 1888.

Application filed September 29, 1886. Serial No. 214,892. (No specimens.) Patented in France March 18, 1886, No. 174,871, and September 15, 1886, No. 178,522; in Belgium March 18, 1886, No. 72,400, September 15, 1886, No. 74,549, and February 21, 1887, No. 76,431; in England September 15, 1886, No. 11,741; in Germany September 16, 1886, No. 41,557, and in Austria-Hungary May 19, 1887, No. 2,152 and No. 16,482.

*To all whom it may concern:*

Be it known that I, WILHELM GRAFF, manufacturer, a subject of the King of Prussia, residing at Lesum, near Bremen, Prussia, German Empire, have invented certain new and useful Improvements in Treating Wool-Fat, (for which I have obtained Letters Patent in Germany, dated September 16, 1886, No. 41,557; in France, dated March 18, 1886, No. 174,871;
September 15, 1886, No. 178,522, and October 7, 1886, No. 174,871; in Belgium, dated March 18, 1886, No. 72,400, September 15, 1886, No. 74,549, and February 21, 1887, No. 76,431; in Austria-Hungary, dated May 19, 1887, Nos. 2,152 and 16,482, and in Great Britain, dated September 15, 1886, No. 11,741;) and I do hereby declare the following to be a full, clear, and exact description of the invention, such as will enable others skilled in the art to which it appertains to make and use the same.

This invention relates to the treatment of the liquor or lyes resulting from the scouring of wool, with a view to the recovery therefrom of its fatty constituents.

Before the wool can be worked it is first washed in cold water to remove the suint (wollschweiss) and other impurities soluble in water. The residuary liquor resulting from this operation is usually treated for potash. The wool so cleansed is next subjected to the process of washing proper in the well-known wool-washing machines in a solution of soda or potash and soap heated to about 40° centigrade. In this second process of washing the wool is freed from the wool-fat as well as from the fatty acids and other impurities insoluble in cold water. If the liquid resulting from this second operation of washing were allowed to flow into running streams, the water thereof would become so polluted as to be unfit for use and detrimental to the fisheries. The methods heretofore adopted for purifying this liquor or wash-water have the great disadvantage of being too costly to be profitably employed. Ordinarily this second wash-water is treated with lime-milk; but this treatment has the disadvantage that the water decanted or removed from the precipitate contains a large proportion of caustic potash or soda, so that such water cannot be emptied into a running stream, but has to be subjected to a second process of treatment to remove the caustic alkalies.

Another process of treatment has been proposed—namely, by means of "neutral" chloride of calcium. This process, however, has the disadvantage that the precipitate contains a comparatively large proportion of carbonate of lime, which is produced by the reaction of the neutral chloride on the alkali. Irrespective of the useless increase by the carbonate in the volume of the precipitate, the said carbonate hinders the separation of the precipitate from the liquor, while the operations of recovering the wool-fat and fatty acids are rendered more difficult. I have found that all these difficulties are obviated by treating the mother-lye with an acid solution of chloride of calcium, instead of a neutral solution thereof, and by adding caustic lime to the lye, which may be done immediately after precipitation and before the separation of the liquid or thereafter.

Under acid solutions of chloride of calcium I comprehend such as contain free hydrochloric acid; and to be assured that the reaction will take place in the presence of hydrochloric acid this may be added to the lye before treating the same with calcium chloride.

To these ends the invention consists in treating the liquor or lye resulting from the process of scouring wool with an acid solution of chloride of calcium—that is to say, a solution of chloride of calcium containing free hydrochloric acid; and the invention further consists in treating the precipitate obtained from the lyes resulting from the process of scouring wool with caustic lime, substantially as hereinafter fully described, and as set forth in the claims.

In carrying out my invention I prepare a solution of chloride of calcium, to which I add hydrochloric acid in such quantities that when the solution is mixed with the mother-lye and its constituents precipitated the residuary liquor when separated from the precipitate will not have an acid reaction. The acid solution of chloride of calcium is mixed with the lye in the collecting-reservoir, and the whole is thoroughly agitated by injecting air or steam. The hydrochloric acid converts the alkali carbonate into soluble chloride of sodium or chloride of potassium under liberation of carbonic acid. The precipitate formed contains sebate of lime (lime-soap) and wool-fat, but very little or no carbonate of lime, according to the care taken in the acidification of the chloride-of-calcium solution.

The following formulæ present the chemical reactions in the precipitation with an acid and a neutral solution of chloride of calcium, F indicating the sebacic or fatty acids in the lye:

Acid solution of the chloride of calcium: $CaCl_2 + 2HCl + 2NaF + Na_2CO_3 = CaF_2, 4NaCl + CO_4 + H_2O$.

Neutral solution of chloride of calcium: $2CaCl_2 + Na_2CO_3 + 2NaF = CaF_2 + 4NaCl + CaCO_3$.

The proportion of acid solution of chloride of calcium employed cannot be positively stated, as it will depend upon the proportion of saponified matter and alkali carbonate present in the lye, and is to be so proportioned that after precipitation no further precipitate will be formed by a further addition of acid solution of chloride of calcium, and that the residuary liquor will be neutral and under no circumstances show an acid reaction. The lime precipitate so obtained may then be treated with benzine, as usual, for the recovery of the wool-fat. In this operation, however, not only are neutral non-saponifiable fats extracted, but also free sebacic or fatty acids, as well as such acids combined with cholesterine, while the benzine will also take up undecomposed soap, which is always present in the precipitate. These difficulties are not only encountered in the treatment of the lyes referred to by means of an acid solution of chloride of calcium, but also in the treatment of such lyes by means of a neutral solution of the salt. These difficulties I overcome by the addition of caustic lime immediately after precipitation or after the liquid is decanted from the precipitate to bind all the free sebacic acids or those combined with cholesterine, and it will be found that all of said acids in the precipitate will be combined with the lime. The caustic lime is applied in the form of milk of lime—about five to seven parts of caustic lime slaked in a sufficient quantity of water to every one hundred parts of the precipitate.

Whether the lime-milk is added before or after decantation, the precipitate is freed from as much of the liquor as possible, either by thorough filtration or in a filter-press, and then dried preferably in a steam-bath.

In the subsequent treatment of the precipitate with benzine the non-saponifiable fats are extracted, and the remaining mass consists, irrespective of impurities, of lime-soap, which, when treated with hydrochloric acid, will yield sebacic acids.

Another advantage resulting from my process is that in the absence of alkali carbonates much less hydrochloric acid is required in the recovery of the sebacic acids.

When the precipitation is effected by means of a neutral solution of chloride of calcium, four equivalents of hydrochloric acid are required in the subsequent treatment of the lime-soap, while but two equivalents of the acid are required when the precipitation is effected by means of an acid solution of the salt.

Inasmuch as the decomposition of the lime-soap is effected by an excess of hydrochloric acid, the acid solution of chloride of calcium is thereby obtained for use in the process of precipitation. When, on the contrary, the lyes are treated directly with milk of lime, (one of the oldest methods used,) the residuary liquor contains caustic soda or caustic potash, which has to be eliminated before the liquor is allowed to flow into running streams, which is not the case when the lyes are treated with an acid solution of calcium chloride and caustic lime is added to the precipitate obtained, the residuary liquid in this case containing principally chloride of sodium or potassium.

Having described my invention, what I claim is—

1. The herein-described process of recovering the fatty constituents from the lyes resulting from the secondary washing of wool after having been scoured in cold water to remove the suint and other impurities soluble in cold water, which consists in treating the lyes with an acid solution of calcium chloride and mixing caustic lime in excess with the precipitate obtained prior to extracting the non-saponifiable fatty constituents therefrom.

2. The herein-described process of recovering the fatty constituents from the lyes resulting from the secondary washing of wool after having been scoured in cold water to remove the suint and other impurities soluble in cold water, which consists in treating the lyes with an acid solution of calcium chloride, mixing caustic lime in excess with the precipitate obtained, and drying the mixture, and finally extracting the non-saponifiable constituents by means of benzine, substantially as and for the purpose specified.

In testimony whereof I affix my signature in presence of two witnesses.

WILHELM GRAFF.

Witnesses:
PAUL BOECK,
B. ROI.